United States Patent
Guo et al.

(10) Patent No.: US 9,923,196 B2
(45) Date of Patent: Mar. 20, 2018

(54) CONDUCTIVE MAT FOR BATTERY ELECTRODE PLATE REINFORCEMENT AND METHODS OF USE THEREFOR

(71) Applicant: JOHNS MANVILLE, Denver, CO (US)

(72) Inventors: Zhihua Guo, Centennial, CO (US); Souvik Nandi, Highlands Ranch, CO (US); Jawed Asrar, Englewood, CO (US); Albert G Dietz, III, Littleton, CO (US)

(73) Assignee: Johns Manville, Denver, CO (US)

( * ) Notice: Subject to any disclaimer, the term of this patent is extended or adjusted under 35 U.S.C. 154(b) by 546 days.

(21) Appl. No.: 14/045,579

(22) Filed: Oct. 3, 2013

(65) Prior Publication Data

US 2015/0099153 A1    Apr. 9, 2015

(51) Int. Cl.
| | |
|---|---|
| *H01M 4/14* | (2006.01) |
| *H01M 2/16* | (2006.01) |
| *H01M 4/04* | (2006.01) |
| *H01M 4/20* | (2006.01) |
| *H01M 10/12* | (2006.01) |

(52) U.S. Cl.
CPC ............. *H01M 4/14* (2013.01); *H01M 2/162* (2013.01); *H01M 2/1606* (2013.01); *H01M 2/1613* (2013.01); *H01M 2/1673* (2013.01); *H01M 2/1686* (2013.01); *H01M 4/0404* (2013.01); *H01M 4/20* (2013.01); *H01M 10/12* (2013.01); *H01M 2220/20* (2013.01); *Y02E 60/126* (2013.01); *Y10T 29/49108* (2015.01)

(58) Field of Classification Search
CPC ...................................... H01M 4/14
See application file for complete search history.

(56) References Cited

U.S. PATENT DOCUMENTS

| | | | |
|---|---|---|---|
| 4,216,280 A | 8/1980 | Koro et al. | |
| 4,336,314 A * | 6/1982 | Yonezu | H01M 2/0242 |
| | | | 429/145 |
| 4,606,982 A | 8/1986 | Nelson et al. | |
| 4,873,157 A | 10/1989 | Flicker et al. | |

(Continued)

FOREIGN PATENT DOCUMENTS

| | | |
|---|---|---|
| DE | 20 2004 020668 U1 | 1/2006 |
| EP | 2 390 947 A1 | 11/2011 |

(Continued)

OTHER PUBLICATIONS

JPH03203158translation.*
U.S. Appl. No. 13/562,468, filed Jul. 31, 2012, Guo et al.

*Primary Examiner* — Sarah A. Slifka
*Assistant Examiner* — Brian R Ohara
(74) *Attorney, Agent, or Firm* — Robert D. Touslee

(57) ABSTRACT

According to one embodiment, a plate or electrode for a lead-acid battery includes a grid of lead alloy material, a paste of active material applied to the grid of lead alloy material, and a nonwoven fiber mat disposed at least partially within the paste of active material. The nonwoven fiber mat includes a plurality of fibers, a binder material that couples the plurality of fibers together, and a conductive material disposed at least partially within the nonwoven fiber mat so as to contact the paste of active material. In some embodiments, the nonwoven fiber mat may have an electrical resistant of less than about 100,000 ohms per square to enable electron flow on a surface of the nonwoven fiber mat.

16 Claims, 3 Drawing Sheets

(56) References Cited

U.S. PATENT DOCUMENTS

| | | | |
|---|---|---|---|
| 5,206,099 A * | 4/1993 | Kulkarni | H01M 2/14 429/142 |
| 5,667,917 A | 9/1997 | Edwards et al. | |
| 5,798,189 A * | 8/1998 | Hayashida | H01M 2/162 429/101 |
| 6,103,413 A * | 8/2000 | Hinton | C25B 9/04 428/411.1 |
| 6,180,281 B1 * | 1/2001 | Schneider | H01M 2/162 429/129 |
| 2002/0071913 A1 * | 6/2002 | Jen | H01M 4/0402 427/299 |
| 2003/0054236 A1 * | 3/2003 | Zucker | H01M 2/1606 429/145 |
| 2005/0123822 A1 * | 6/2005 | Ishikawa | H01M 8/0221 429/513 |
| 2008/0076028 A1 | 3/2008 | Miller et al. | |
| 2011/0216476 A1 | 9/2011 | Fleischer et al. | |
| 2011/0293988 A1 * | 12/2011 | Obernyer | H01M 4/20 429/144 |
| 2011/0311876 A1 * | 12/2011 | Sturgeon | H01M 4/663 429/232 |
| 2011/0318643 A1 | 12/2011 | Clement et al. | |
| 2012/0070729 A1 * | 3/2012 | Wertz | C03C 3/064 429/188 |
| 2013/0273409 A1 | 10/2013 | Nandi | |

FOREIGN PATENT DOCUMENTS

| | | | |
|---|---|---|---|
| FR | 2937799 | 4/2010 | |
| JP | H03203158 * | 9/1991 | H01M 2/16 |
| WO | 2012/177869 A2 | 12/2012 | |
| WO | 2013/053957 A1 | 4/2013 | |

\* cited by examiner

CONDUCTIVE MAT FOR BATTERY ELECTRODE PLATE REINFORCEMENT AND METHODS OF USE THEREFOR

BACKGROUND OF THE INVENTION

Lead-acid batteries are characterized as being inexpensive and highly reliable. As such, they are widely used as an electrical power source for starting motor vehicles, golf carts, and other electric vehicles. In recent years, a variety of measures to improve fuel efficiency have been considered in order to prevent atmospheric pollution and global warming. Examples of motor vehicles subjected to fuel-efficiency improvement measures that are being considered include idling stop vehicles (ISS vehicles) where the engine is stopped when the vehicle is not in motion to prevent unnecessary idling of the engine and to reduce engine operation time.

In an ISS vehicle, the number of engine startup cycles is higher, and the lead-acid battery discharges a large electrical current during each startup. In addition, the amount of electricity generated by the alternator in an ISS vehicle is smaller, and the lead-acid battery is charged in an intermittent manner. As such, charging of the battery is often insufficient. Stated differently, the battery is in a partially charged state known as a PSOC (i.e., partial state of charge). Accordingly, a lead-acid battery used in an ISS vehicle is required to have a capability in which the battery is charged as much as possible in a relatively short time. In other words, the lead-acid battery should have a higher charge acceptance. Therefore, improvements in the charge acceptance of a lead-acid battery are desired.

Lead-acid batteries typically have a shorter lifespan when used under PSOC than in an instance in which the battery is used in a fully charged state. One reason for the shorter lifespan under PSOC is believed to be due to repeatedly charging and recharging the battery in an insufficiently charged state. Charging and recharging the battery in this manner negatively affects the battery's electrodes or plates. For example, lead sulfate forms on the negative plate during discharge and undergoes progressive coarsening during charging and tends not to return to metallic lead. Improving the charge acceptance may prevent the battery from being charged and recharged in an insufficiently charged state, which may inhibit coarsening of lead sulfate due to repeated charging/discharging. This may increase the life span of the lead-acid battery.

In addition, there are inherent disadvantages to lead-acid batteries. For example, during discharge of the lead-acid battery, the lead dioxide (a fairly good conductor) in the positive plate is converted to lead sulfate (an insulator). The lead sulfate can form an impervious layer encapsulating the lead dioxide particles which limits the utilization of lead dioxide to less than 50 percent of capacity, and more commonly around 30 percent. The low percentage of usage is a key reason why the power and energy performance of a lead-acid battery is inherently less than optimum. It is believed that this insulator layer leads to higher internal resistance for the battery. Improving the charge acceptance may also help reduce issues associated with formation of lead sulfate.

BRIEF SUMMARY OF THE INVENTION

The embodiments described herein provide nonwoven fiber mats that can be used to reinforce plates in lead-acid batteries and/or that have an electrically conductive surface that enhances electron flow from the battery plates. The nonwoven fiber mats described herein may improve the charge acceptance of a lead-acid battery in addition to reinforcing the battery's plates or electrodes. According to one embodiment, a lead-acid battery is provided. The lead-acid battery may include a positive electrode, a negative electrode, a separator positioned between the positive electrode and the negative electrode to electrically insulate the positive and negative electrodes, and a fiber mat (reinforcement mat) that is positioned adjacent either the positive electrode or the negative electrode to reinforce the positive or negative electrode. The separator may also include a nonwoven fiber mat that is used to reinforce the separator. The reinforcement mat may include: a plurality of fibers, a binder material that couples the plurality of fibers together, and a conductive material that is disposed on at least one surface of the reinforcement mat or throughout the reinforcement mat so as to contact the positive or the negative electrode. The reinforcement mat may have an electrical resistant of less than about 100,000 ohms per square so as to enable electron flow on the surface or through the reinforcement mat.

In some embodiments, the reinforcement mat may have an electrical resistant of less than about 50,000 ohms per square. In some embodiments, the separator may also include a conductive material that is disposed on at least one surface of the separator's fiber mat or throughout the separator's fiber mat such that the separator's fiber mat comprises an electrical resistant of less than about 100,000 ohms per square to enable electron flow on the surface of the separator's fiber mat.

In some embodiments, the conductive material may include a plurality of conductive fibers that are entangled with fibers of the reinforcement mat. In some embodiments, the binder material may include the plurality of conductive fibers. In some embodiments, the plurality of fibers of the reinforcement mat may include glass fibers. In some embodiments, the reinforcement mat may be a first fiber mat that is positioned on a first side of the positive electrode or the negative electrode and the lead-acid battery may also include a second fiber mat that is positioned on a second side of the positive electrode or the negative electrode opposite the first side. The second fiber mat may include a conductive material disposed on at least one surface of the second fiber mat or throughout the second fiber mat such that the second fiber mat has an electrical resistant of less than about 100,000 ohms per square to enable electron flow on the surface of the second fiber mat.

According to another embodiment, a plate or electrode for a lead-acid battery is provided. The plate or electrode may include a grid of lead alloy material, a paste of active material applied to the grid of lead alloy material, and a nonwoven fiber mat that is disposed at least partially within the paste of active material. The nonwoven fiber mat may include: a plurality of fibers, a binder material that couples the plurality of fibers together, and a conductive material that is disposed at least partially within the nonwoven fiber mat so as to contact the paste of active material. The nonwoven fiber mat may have an electrical resistant of less than about 100,000 ohms per square to enable electron flow on a surface of the nonwoven fiber mat.

In some embodiments, the nonwoven fiber mat may be disposed within the paste of active material between about 0.001 inches and about 0.020 inches. In some embodiments, the nonwoven fiber mat may be a first nonwoven fiber mat and the plate or electrode may also include a second nonwoven fiber mat that is disposed at least partially within the paste of active material on a side opposite the first nonwoven fiber mat. In such embodiments, the plate or electrode may be disposed between two nonwoven fiber mats. In some embodiments, the two nonwoven fiber mats may be opposite sides of a bag that encloses or envelopes the paste of the active material and the plate or electrode.

In some embodiments, the binder may be applied to the nonwoven fiber mat between about 10% and 45% by weight, between about 20% and 30% by weight, and the like. In some embodiments, the binder may include the conductive material. In some embodiments, the nonwoven fiber mat may include fibers selected from the group consisting of: glass fibers, polyolefin fibers, and polyester fibers. In some embodiments, the conductive material may include a plurality of conductive fibers that are entangled with fibers of the nonwoven fiber mat.

According to another embodiment, a method of manufacturing a plate of a lead-acid battery is provided. The method may include providing a grid of lead alloy material and applying a paste of active material to the grid of lead alloy material to form a battery plate or electrode (i.e., negative or positive electrode). A nonwoven fiber mat may be applied to a surface of the paste of the active material such that the nonwoven fiber mat is disposed at least partially within the paste of active material. The nonwoven fiber mat may include a plurality of fibers, a binder material that couples the plurality of fibers together, and a conductive material disposed at least partially within the nonwoven fiber mat so as to contact the paste of active material. The nonwoven fiber mat may have an electrical resistance of less than about 100,000 ohms per square to enable electron flow on a surface of the nonwoven fiber mat. In some embodiments, the nonwoven fiber mat may be disposed within the paste of active material between about 0.001 inches and about 0.020 inches.

In some embodiments, the method may also include applying a second nonwoven fiber mat to an opposite surface of the paste of active material so that the grid of lead alloy material is disposed between two nonwoven fiber mats. The second nonwoven fiber mat may also include a conductive material that is disposed at least partially within the second nonwoven fiber mat so as to contact the paste of active material. In some embodiments, the nonwoven fiber mat may have a thickness of 0.009 inches or less and/or a tensile strength of at least 30 lbs/3 inch.

In some embodiments, the plurality of fibers may include first fibers having fiber diameters between about 6 µm and about 11 µm and second fibers having fiber diameters between about 10 µm and about 20 µm. In some embodiments, the binder may include the conductive material. The binder may be applied to the mat between about 10% and 45% by weight, between about 20% and 30% by weight, and the like. In some embodiments, the conductive material may include a plurality of conductive fibers that are entangled with fibers of the nonwoven fiber mat.

BRIEF DESCRIPTION OF THE DRAWINGS

The present invention is described in conjunction with the appended figures.

Figure 1:
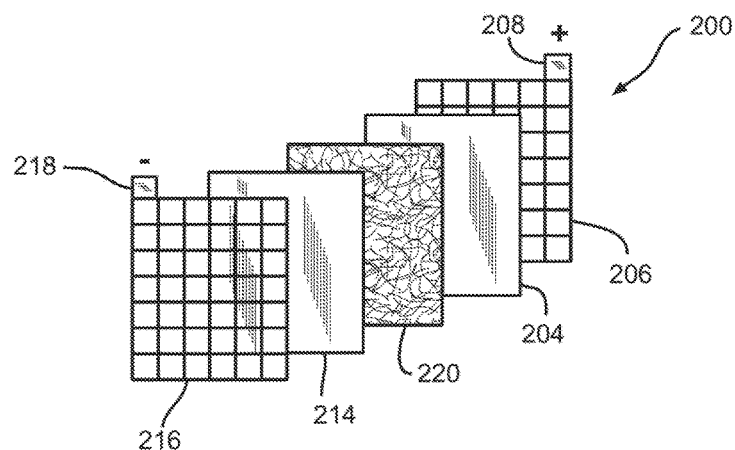
FIG. 1 illustrates an exploded perspective view of a battery cell assembly.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the exemplary embodiments will provide those skilled in the art with an enabling description for implementing one or more exemplary embodiments. It being understood that various changes may be made in the function and arrangement of elements without departing from the spirit and scope of the invention as set forth in the appended claims.

Embodiments of the invention provide nonwoven fiber mats (hereinafter conductive reinforcement mat or reinforcement mat) that can be used to reinforce plates in lead-acid batteries, or other batteries, and that have an electrically conductive surface that enhances electron flow to and/or from the battery plates. The conductive reinforcement mats can be any woven or non-woven mat which is acid resistant, such as glass mat, or mat made from mainly polyolefin fibers, or mixture of polyolefin and glass fibers. In some embodiment, the electron flow is enhanced by providing a mat having a conductive surface or surfaces and/or other conductive pathway. The enhanced electron flow extends the battery's life, especially in lead acid batteries where continual discharge and recharge of the battery results in degradation of the battery's electrodes. For example, during discharge of the lead acid battery, lead dioxide (a good conductor) in the positive electrode plate is converted to lead sulfate, which is generally an insulator. The lead sulfate can form an impervious layer or layers encapsulating the lead dioxide particles, which may limit the utilization of the lead dioxide, and thus the battery, to less than 50 percent of capacity, and in some cases about 30 percent. The insulative lead sulfate layer may also lead to higher resistance for the battery. The effect may be a decrease in the electrical current provided by the battery and/or in the discharge life of the battery. The conductive reinforcement mat may replace other plate reinforcement means, such as paper, that are currently used in lead-acid or other batteries. The conductive reinforcement mat provides several advantages over the current plate reinforcement means, such as not dissolving in the electrolyte (e.g., sulfuric acid); providing vibration resistance, reducing plate shedding, strengthening or reinforcing the plate; and/or providing good dimensional stability, which may allow easier guiding or handling during battery plate manufacturing processes.

In regards to the conductive properties of the conductive reinforcement mat, the electrically conductive surface of the mat may provide an additional route for electron flow. The route provided by the mat is typically separate from the route provided by the conductor plate or grid of the battery. The multiple electron paths (e.g., the mat and conductor plate) allows the electrons to flow via either or both the conductive reinforcement mat or the conductor plate/grid depending on which route provides the least electrical resistance. In this manner, as the electrode degrades due to formation of lead sulfate, numerous routes for the electrons are maintained, thereby extending the overall life of the battery. In some embodiments, the battery may include a battery separator that also includes a conductive material. The battery separator may provide extra electron flow routes in addition to the fiber mat and conductor plate or grid.

The conductive reinforcement mat also provides excellent plate or electrode reinforcement due to their excellent strength properties. The conductive reinforcement mat may also have a relatively small or decreased mat size. The relatively thin fiber mats reduce the overall volume that the mat occupies, which allows an increased amount of electrolyte and/or active material paste to be used within the lead-acid battery. The thinner mats also improve processing efficiency by increasing the mat footage on the processing rolls, which reduces the frequency of roll changing. In some embodiments, the conductive reinforcement mat may be less than 10 mils thick (i.e., 0.010 inches), and more commonly less than 9 mils thick (i.e., 0.009 inches). In one embodiment, the conductive reinforcement mat is about 6 mils and 8 mils or between about 6 mils and 7 mils thick.

In some embodiments, the conductive reinforcement mats may include a combination of electrically insulative fibers and a conductive material. The electrically insulative fibers may have an electrical resistance greater than about 1 million ohms per square. In one embodiment, the electrically insulative fibers may include glass fibers, polyolefin fibers, polyester fibers, and the like. For convenience in describing the embodiments, the disclosure herein will described mainly glass fibers, although it should be realized that other electrically insulative fibers may be used.

The electrically conductive material may include a layer or mat of conductive fibers or a layer of other conductive materials, such as a metallic sheet or film that is positioned atop the electrically insulative fiber layer. In many embodiments, the conductive material is a non-metal material. In some embodiments, the conductive material may include a coating of conductive material applied to or atop the fiber mat. In a specific embodiment, the conductive material may be added to a binder material that is applied to the plurality of insulative fibers during manufacture of the fiber mat, or that is sprayed atop a previously manufactured fiber mat. The conductive material may include conductive polymers (e.g., polyanilines), carbon material (e.g., carbon black, activated carbon, graphite, carbon nanofibers, carbon nanotubes, graphene, CNS (carbon nanostructure)), and the like. In a specific embodiment, the conductive material may include conductive fibers that are disposed at least partially within and/or entangled with a fiber mat having the insulative fibers. The conductive fibers may be mixed with the insulative fibers (e.g., glass fibers, polymeric fibers, and the like) to make a mat that is conductive. In an exemplary embodiment, graphene or CNS may be used due to their high electrical conductivity and inertness to sulfuric acid. CNS may be more commonly used since it can be readily dispersed in water.

The conductive reinforcement mat is typically positioned within the battery so that the electrically conductive material/layer contacts the active paste of the battery's electrodes. The conductive layer mat may be disposed across substantially the entire surface of the conductive reinforcement mat so that the electrically conductive layer is substantially equal in size and shape to the conductive reinforcement mat. In this manner the electrically conductive layer provides a large conductive surface that contacts the electrode.

The conductive reinforcement mats may have a total tensile strength of at least 30 lbs/3 inch and more commonly at least 35 lbs/3 inch. To achieve this tensile strength, the nonwoven fiber mat may have a tensile strength in the machine direction of at least 22 lbs/3 inch and a tensile strength in the cross-machine direction of at least 13 lbs/3 inch. The description of "lbs/3 inch" generally refers to a method of testing the mat strength where a 3 inch by 12 inch rectangular piece of the fiber mat is subjected to a tensile stress until the mat fails, such as by ripping or tearing. Mats having tensile strengths less than 22 lbs/3 inch in the machine direction and less than 13 lbs/3 inch in the cross-machine direction may not have sufficient strength to withstand winding and rewinding during processing and/or to reinforce plates of a lead-acid or other battery.

In some embodiments, the conductive reinforcement mats may include a blend of two or more different sized coarse diameter fibers. The description of coarse diameter fibers generally includes fibers ranging in diameter between about 6 μm and about 22 μm in one embodiment, and between about 8 μm and about 20 μm in another embodiment. For example, in one embodiment, a conductive reinforcement mat may include a blend of first glass fibers having fiber diameters in the range of between 6 μm and 11 μm and second glass fibers having fiber diameters in the range of between 10 μm and 20 μm. In one embodiment, the nonwoven fiber mats include at least 25% of each of the first and second glass fibers. The glass fibers typically have fiber lengths that range between about ⅓ of an inch to about 1½ inches, although fiber lengths are more commonly about ⅓ inch to ¾ inch or 1 inch.

The conductive reinforcement mats also include a binder that bonds the glass fibers together, and that bonds the conductive fibers to the glass fibers when conductive fibers are employed as the conductive material. The binder is typically applied to the glass fibers so that the binder comprise between about 10% and 45% by weight of the conductive reinforcement mats, between about 15% and 35% by weight of the conductive reinforcement mats, and more commonly comprises between about 20% and 30% by weight of the conductive reinforcement mats. The binder is generally a chemically-resistant binder (e.g., an acrylic binder) that delivers the durability to survive in the acid environment throughout the life of the battery and the strength to survive the plate pasting operation. In a specific embodiment, the binder may also include the conductive material. For example, the conductive material (e.g., graphene and the like) may be dispersed within the binder.

According to one embodiment, a fiber mat (e.g., glass fiber mat) may be coated with the conductive material to form the conductive reinforcement mat. This may be achieved via dip-coating, curtain coating, spraying, dip-and-squeeze techniques, and the like. In another embodiment, the conductive material may be mixed with the binder and applied on the fiber mat during the binder application. The latter process represents a "one-step" or single application process. The binder may help bond the conductive material to the mat. Having described several embodiments of the invention, additional aspects will be more apparent with reference to the figures described below.

In some embodiments, the conductive material of the reinforcement mat may be non-metal. The non-metal conductive material coated mat may be used for reinforcing electrode plates and can provide benefits described herein, such as improving electron transfer and current output, reducing internal resistance of the battery, improving charging acceptance, and the like. It is believed that by using a non-metal conductive material coated mat either as a separator support mat or plate reinforcement mat, the electrons do not have to go through the electrode spot where a higher resistance exists (e.g., due to micro-cracks and the like). The electrons can flow freely on the conductive surface of the mat and choose the contacting spot having minimum resistance. This benefit becomes more pronounced after the battery is used for an extend period of time.

Figure 2:
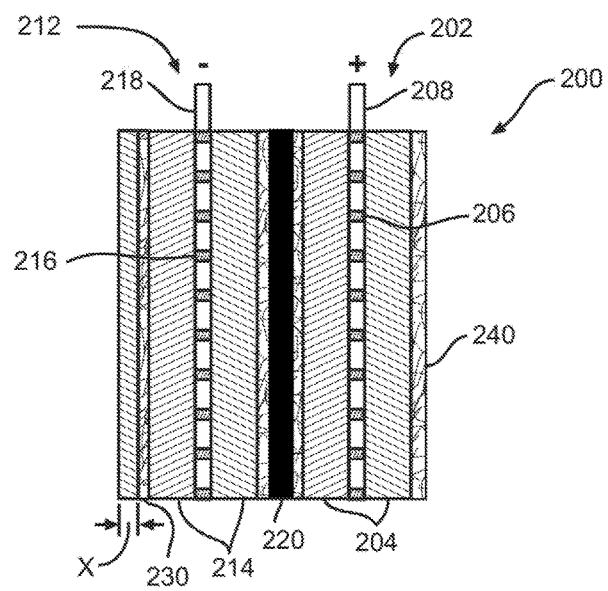
FIG. 2 illustrates an assembled cross section view of the battery cell assembly of FIG. 1.

FIGS. 1 and 2, respectively, show a perspective exploded view of a lead-acid battery cell 200 and a cross-section assembled view of the lead-acid battery cell 200. Each cell 200 may provide an electromotive force (emf) of about 2.1 volts and a lead-acid battery may include 3 such cells 200 connected in series to provide an emf of about 6.3 volts or may include 6 such cells 200 connected in series to provide an emf of about 12.6 volts, and the like. Cell 200 includes a positive plate or electrode 202 and a negative plate or electrode 212 separated by battery separator 220. Positive electrode 202 includes a grid or conductor 206 of lead alloy material. A positive active material 204, such as lead dioxide, is typically coated or pasted on grid 206. Grid 206 is also electrically coupled with a positive terminal 208. Grid 206 provides structural support for the positive active material 204 along with electrical conductivity to terminal 208.

Likewise, negative electrode 212 includes a grid or conductor 216 of lead alloy material that is coated or pasted with a negative active material 214, such as lead. Grid 216 is electrically coupled with a negative terminal 218. Like grid 206, grid 216 structurally supports the negative active material 214 along with providing electrical conductance to terminal 218. Positive electrode 202 and negative electrode 212 are immersed in an electrolyte (not shown) that may include sulfuric acid and water. Battery separator 220 is positioned between positive electrode 202 and negative electrode 212 to physically separate the two electrodes while enabling ionic transport, thus completing a circuit and allowing an electronic current to flow between positive terminal 208 and negative terminal 218. Separator 220 typically includes a microporous membrane (i.e., the solid black component), which is often a polymeric film having negligible conductance. The polymeric film may include micro-sized voids that allow ionic transport (i.e., transport of ionic charge carriers) across separator 220. In one embodiment, the microporous membrane or polymeric film may have a thickness of 50 micrometers or less, and preferably 25 micrometers or less, may have a porosity of about 50% or 40% or less, and may have an average pore size of 5 micrometers or less and preferably 1 micrometer or less. The polymeric film may include various types of polymers including polyolefins, polyvinylidene fluoride, polytetrafluoroethylene, polyamide, polyvinyl alcohol, polyester, polyvinyl chloride, nylon, polyethylene terephthalate, and the like. Separator 220 may also include one or more fiber mats that are positioned adjacent one or both sides of the microporous membrane/polymeric film to reinforce the microporous membrane and/or provide puncture resistance.

Figure 3A:
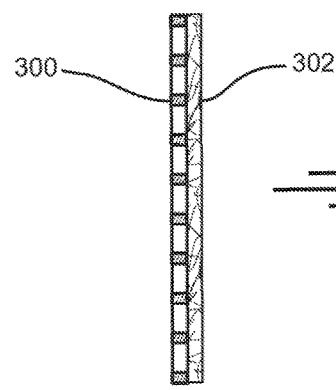
FIGS. 3A-3C illustrate cross section views of various configurations of an electrode or plate and a nonwoven fiber mat.
Figure 3B:
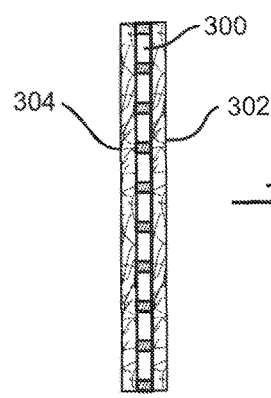
Figure 3C:
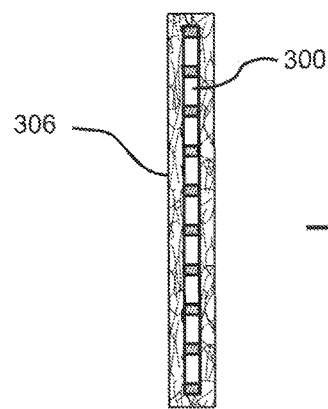

Positioned near a surface of negative electrode 212 is a nonwoven fiber mat 230 (referred to herein as a reinforcement mat). Reinforcement mat 230 is disposed partially or fully over the surface of negative electrode 212 so as to partially or fully cover the surface. As shown in FIGS. 3A-3C, a reinforcement mat 230 may be disposed on both surfaces of the negative electrode 212, or may fully envelope or surround the electrode. Likewise, although reinforcement mat 230 is shown on the outer surface of the electrode 212, in some embodiments reinforcement mat 230 may be positioned on the inner surface of the electrode 212 (i.e., adjacent separator 220). Reinforcement mat 230 reinforces the negative electrode 212 and provides an additional supporting component for the negative active material 214. The additional support provided by reinforcement mat 230 may help reduce the negative effects of shedding of the negative active material particles as the active material layer softens from repeated charge and discharge cycles. This may reduce the degradation commonly experienced by repeated usage of lead-acid batteries.

Reinforcement mat 230 is often impregnated or saturated with the negative active material 214 so that the reinforcement mat 230 is partially or fully disposed within the active material 214 layer. Impregnation or saturation of the active material within the reinforcement mat means that the active material penetrates at least partially into the mat. For example, reinforcement mat 230 may be fully impregnated with the negative active material 214 so that reinforcement mat 230 is fully buried within the negative active material 214 (i.e., fully buried within the lead paste). Fully burying the reinforcement mat 230 within the negative active material 214 means that the mat is entirely disposed within the negative active material 214. In one embodiment, reinforcement mat 230 may be disposed within the negative active material 214 up to about a depth X of about 20 mils (i.e., 0.020 inches) from an outer surface of the electrode 212. In other embodiments, the glass mat 230 may rest atop the negative active material 214 so that the mat is impregnated with very little active material. Often the reinforcement mat 230 will be impregnated with the negative active material 214 so that the outer surface of the mat forms or is substantially adjacent the outer surface of the electrode 212 (see reinforcement mat 240). In other words, the active material may fully penetrate through the reinforcement mat 230 so that the outer surface of the electrode 212 is a blend or mesh of active material and reinforcement mat fibers.

Reinforcement mat 230 may include a conductive material so as to make reinforcement mat 230 electrically conductive. For example, a conductive layer may be formed on one or more sides of reinforcement mat 230 by applying a conductive material to the surface of reinforcement mat 230. The conductive layer may be positioned to face and contact electrode 212 to provide electrical pathways along which the electrons may flow. The conductive material contacts the electrode 212, and more specifically the active material of electrode 212 to enable electron flow on a surface or through reinforcement mat 230. The conductive material and/or layer of reinforcement mat 230 may have an electrical resistance of less than about 100,000 ohms per square and more commonly less than about 50,000 ohms per square so as to enable or enhance electron flow on the surface of the mat 230. In some embodiments, the conductive layer of reinforcement mat 230 may be electrically coupled with a negative terminal 218 to provide a route or path for current flow to terminal 218.

As described herein, electrons may flow along either reinforcement mat 230 or grid/conductor 216 depending on which conductive surface provides an electrical path of least electrical resistance. For example, electrons proximate to terminal 218 may flow along an electrical path of grid/conductor 216 while electrons distal to terminal 218 may flow along an electrical path of reinforcement mat 230 due to a buildup of lead sulfate on grid/conductor 216 at the distal location.

In one embodiment, the conductive layer of reinforcement mat 230 may be formed on a surface of electrically insulative fibers (e.g., glass fibers) by coating the conductive material onto the insulative fibers or by spraying the conductive material on the surface of reinforcement mat 230. In a specific example, the conductive material may be added to a primary binder material that is applied to the wet-laid insulative fibers to couple the fibers together. The primary binder/conductive material mixture and wet-laid insulative fibers may then be cured so that the conductive material completely coats or is saturated throughout reinforcement mat 230 to form the conductive layer. In another embodiment, reinforcement mat 230 may be manufactured in a standard process where a primary binder without the conductive material is applied to the wet-laid insulative fibers to couple the fibers together. The conductive material may then be dispersed in a secondary or dilute binder that is then coated or sprayed onto the surface of reinforcement mat 230. Reinforcement mat 230 may then be cured so that the conductive material forms a conductive layer across the entire surface, or a defined portion, of reinforcement mat 230. In this embodiment, a majority of the conductive material may be positioned atop the surface of reinforcement mat 230.

In another embodiment, a reinforcement mat 230 may be manufactured according to known processes. A catalyst may be subsequently added to a surface of reinforcement mat 230 and metal ions, such as copper, may be grown on the surface of the reinforcement mat via the applied catalyst. In still another embodiment, the conductive material may be added to reinforcement mat 230 via chemical vapor deposition processes.

In lead-acid battery environments, the conductive material used for reinforcement mat 230 should be relatively corrosion resistant due to the aggressive electrochemical environment of the battery. In some embodiments, the conductive material may include a metal, a nanocarbon, graphene, graphite, a conductive polymer (e.g., polyanilines), nanocarbons or carbon nanotubes, copper, titanium oxides, vanadium oxides, tin oxides, and the like. In a specific embodiment, the conductive material may include carbon nano-platelets, such as graphene. The graphene may be added to the primary binder or secondary/dilute binder as described above and applied to reinforcement mat 230 (e.g., a glass or polyolefin fiber mat) between about 0.01% and 50% by weight, or in some embodiments between about 1% and 25% by weight. When cured, the coating of graphene forms a conductive layer across the entire surface, or a defined portion, of reinforcement mat 230.

In another embodiment, the conductive layer may comprise a conductive fiber mat, foil, or screen that is positioned adjacent the surface of reinforcement mat 230 or entangled with the electrically insulative fibers (e.g., glass fibers) of reinforcement mat 230. In one embodiment, the conductive layer may be made by coating or spraying the conductive fibers on the surface of reinforcement mat 230. In another embodiment, a conductive fiber mat may include a plurality of conductive fibers arranged in a non-woven or woven pattern and coupled together via a binder. The conductive fiber mat may be coupled with reinforcement mat 230 via a binder and the like. Electrons may flow along the conductive fiber mat, foil, or screen as described herein, such as up to negative terminal 218.

As briefly described above, reinforcement mat 230 may include a plurality of electrically insulative fibers, such as glass, polyolefin, polyester, and the like, which are primarily used to reinforce the electrode. Because the reinforcement mat 230 is made of such insulative fibers, the reinforcement mat 230 may be essentially non-conductive prior to or without the addition of the conductive material. For example, without combining or adding the conductive material/layer, the reinforcement mat 230 may have an electrical resistance greater than about 1 Megohm per square. In manufacturing the reinforcement mat 230, water or another liquid may be removed (e.g., via a vacuum) from a suspension of the fibers in the liquid medium. A binder may then applied to the wet-laid non-woven glass or polyolefin fibers to form reinforcement mat 230. As described previously, in some embodiments, the conductive material or fibers may be added to the binder and/or to the liquid medium. In one embodiment, reinforcement mat 230 may have a thickness of between about 50 micrometers and about 500 micrometers and have an average pore size of between about 5 micrometers and about 5 millimeters.

Referring now to FIGS. 3A-C, illustrated are various electrode-reinforcement mat configurations. FIG. 3A illustrates a configuration where an electrode 300 has a single reinforcement mat 302 disposed on or near an outer surface. As described above, reinforcement mat 302 may include a conductive material and/or layer so as to enable electron flow on a surface and/or through reinforcement mat 302 to a battery terminal. Reinforcement mat 302 may partially or fully cover the outer surface of electrode 300. The configuration of FIG. 3B is similar to that of FIG. 3A except that an additional reinforcement mat 304 is disposed on or near an opposite surface of electrode 300 so that electrode 300 is sandwiched between the two glass mats, 302 and 304. Either or both reinforcement mats, 302 and 304, may include a conductive material and/or layer to enable electron flow to a battery terminal. As such, electrode 300 may be sandwiched between two conductive reinforcement mats 302 and 304. FIG. 3C illustrates a configuration where a reinforcement mat 306 envelopes or surrounds electrode 300. Although FIG. 3C illustrates the reinforcement mat 306 fully enveloping the electrode 300, in many embodiments a top side or portion of the mat 306, or a portion thereof, is open. Glass mat 306 may include the conductive material and/or layer as described above to enable electron flow.

Positioned near a surface of positive electrode 202 is a reinforcement mat 240. Reinforcement mat 240 may be arranged and/or coupled with positive electrode 202 similar to the arrangement and coupling of reinforcement mat 230 with respect to negative electrode 212. For example, reinforcement mat 240 may be disposed partially or fully over the surface of positive electrode 202 so as to partially or fully cover the surface, may be positioned on an inner surface of the electrode 202 (i.e., adjacent separator 220) instead of the shown outer surface configuration, and/or may be impregnated or saturated with the positive active material 204 so that the reinforcement mat 240 is partially or fully disposed within the active material 204 layer. Like reinforcement mat 230, reinforcement mat 240 also provides additional support to help reduce the negative effects of shedding of the positive active material particles due to repeated charge and discharge cycles.

In some embodiments, reinforcement mat 240 may include a conductive material and/or layer to enable electron flow on a surface and/or through reinforcement mat 240 to positive terminal 208. In such embodiments, electrons may flow along either reinforcement mat 240 or grid/conductor 206 depending on which conductive surface provides an electrical path of least electrical resistance. For example, electrons proximate to terminal 208 may flow along an electrical path of grid/conductor 206 while electrons distal to terminal 208 may flow along an electrical path of reinforcement mat 240. In some embodiments, reinforcement mat 230 and reinforcement mat 240 may both include a conductive material and/or layer to enable electron flow on or relative to both mats.

With regarding to the reinforcement functions of reinforcement mats 230 and/or 240, in some embodiments the reinforcing aspects of these mats may be enhanced by blending fibers having different fiber diameters. Reinforcement mats 230 and 240 (referred to hereinafter as reinforcement mat 230) include a blend of two or more different diameter coarse fibers. In one embodiment, reinforcement mat 230 includes a plurality of first coarse fibers, having fiber diameters ranging between about 6 µm and about 13 µm, between about 6 µm and about 11 µm, or between about 8 µm and about 13 µm. The first coarse fibers are blended with a plurality of second coarse fibers, having fiber diameters ranging between about 10 µm and about 20 µm or between about 13 µm and about 20 µm. In another embodiment, reinforcement mat 230 includes a blend of first coarse fibers having fiber diameters between 6-11 µm or 8-11 µm and second coarse fibers having fiber diameters between 10-20 µm or 13-20 µm. The blend of the two or more different diameter coarse fibers results in a mat that is sufficiently strong to structurally support the active material as described above and to withstand the various plate manufacturing processes while also minimizing the thickness and overall size of the mat. Reducing the thickness of reinforcement mat 230 while maintaining mat strength may be desired since reinforcement mat 230 typically is an chemically inactive component and, thus, does not contribute to the battery's electrochemical process. Reducing the volume of reinforcement mat 230 helps minimize the battery's volume of non-electrochemically contributing components.

In one embodiment, reinforcement mat 230 includes a blend of between 10% and 90% of the first coarse fibers and between 10% and 90% of the second coarse fibers. In another embodiment, reinforcement mat 230 includes a blend of between 25% and 75% of the first coarse fibers and between 25% and 75% of the second coarse fibers. In yet another embodiment, the blend of first coarse fibers and second coarse fibers is approximately equal (i.e., 50% of the first and second coarse fibers).

The length of the coarse fibers may also contribute to the overall strength of reinforcement mat 230 by physically entangling with adjacent fibers or fiber bundles and/or creating additional contact points where separate fibers are bonded via an applied binder. In one embodiment, the first and second coarse fibers have fiber lengths that range between about ⅓ inch and about 1½ inches, although an upper length limit of 1¼ inch is more common. This range of lengths provides sufficient mat strength while allowing the fibers to be dispersed in a white water solution for mat processing applications. In another embodiment, the first and second coarse fibers have fiber lengths that range between ½ and ¾ of an inch. The fibers lengths of the first coarse fibers may be different than the fibers lengths of the second coarse fibers. For example, in one embodiment, the first fibers may have an average fiber length of about % inch while the second coarse fibers have an average fiber length of about ¾ inch. In one embodiment, either or both the first or second coarse fibers have an average fiber length of at least ⅓ inch, while in another embodiment, either or both the first or second coarse fibers have an average fiber length of at least ½ inch.

The type and amount of binder used to bond the first and second coarse fibers together may also contribute to the overall strength and thickness of reinforcement mat 230. As described above, the binder is generally a chemically-resistant binder (e.g., an acrylic binder) that delivers the durability to survive in the acid environment throughout the life of the battery, the strength to survive the plate pasting operation, and the permeability to enable paste penetration. The binder may also include and bond the conductive material to the first and/or second coarse fibers. Increased binder usage may reduce the thickness of reinforcement mat 230 by creating more fiber bonds and densifying reinforcement mat 230. The increased fibers bonds may also strengthen reinforcement mat 230. In one embodiment, the binder is applied to the first and second coarse fibers such that the binder comprises between about 10% and 45% by weight of the reinforcement mat 230 or between about 15% and 35% by weight of the reinforcement mat. In another embodiment, the binder is applied to the first and second coarse fibers such that it comprises between about 20% and 30% by weight of the reinforcement mat 230.

As described herein, the conductive material (e.g., graphene) may be mixed with the binder or a secondary binder and applied to the first and/or second coarse fibers during manufacture of the reinforcement mat 302 or subsequent thereto. The resulting reinforcement mat may have an electrical resistance of less than about 100,000 ohms per square, and more commonly less than about 50,000 ohms per square, to enable electron flow on a surface of, or through, the reinforcement mat.

The above described reinforcement mat 230 configurations provide mats having a total tensile strength of at least 30 lbs/3 inch and more commonly at least 35 lbs/3 inch. Specifically, the reinforcement mat 230 have a tensile strength in the machine direction of at least 22 lbs/3 inch and a tensile strength in the cross-machine direction of at least 13 lbs/3 inch. The above described mats have been found to have sufficient strength to support the active material and to withstand the various stresses imposed during plate or electrode manufacturing and processing (e.g., pasting or applying the active material). Reinforcement mat 230 that do not have the above described tensile strength attributes may not be sufficiently strong to support the applied active material (e.g., prevent shedding and the like) and/or may pose processing issues, such as mat breakage when applying the active material (e.g., lead or lead oxide) paste on the glass mat during the plate reinforcement process.

Further, the above described reinforcement mat 230 configuration provide mats that have a thickness of 10 mils or less (i.e., 0.010 inches) and more commonly 9 mils or less (0.009 inches). In one embodiment, the reinforcement mat 230 have a thickness in the range of between about 6 and 8 mils (i.e., 0.006 and 0.008 inches), and preferably about 7 mils. These mats occupy minimal space within the electrode and battery interior, which allows for additional electrochemically active materials (e.g., additional electrolyte and/or lead or lead oxide paste) to be included in the battery, thereby increasing the life and efficiency of the battery. The above described mats have the unique combination of both minimal size or thickness and strength while also being electrically conductive. The mats may also have a pore size that ranges between 50 microns-5 mm.

In some embodiments, separator 220 may also include a conductive material and/or layer to enable electron flow on a surface and/or through separator 220 to positive terminal 208 and/or negative terminal 218. For example, the fiber mat or mats of separator 220 may include a conductive material and/or layer, such as within a binder of the mats, as a film, mat, or layer of conductive fibers, and/or in accordance with any embodiment described herein. In such embodiments, electrons may flow along reinforcement mat 230, grid/conductor 216, reinforcement mat 240, grid/conductor 206, and/or separator 220 depending on which conductive path provides the least electrical resistance. For example, electrons proximate to grid/conductor 216 may flow along grid/conductor 216 and/or reinforcement mat 230 to terminal 218 while electrons proximate to separator 220 flow along an electrical path of separator 220 to terminal 218. Similarly, electrons proximate to grid/conductor 206 may flow along grid/conductor 206 and/or reinforcement mat 240 to terminal 208 while electrons proximate to separator 220 flow along an electrical path of separator 220 to terminal 208. In such embodiments, the available or possible electron paths may be greatly increased.

Processes and Methods

Figure 4:
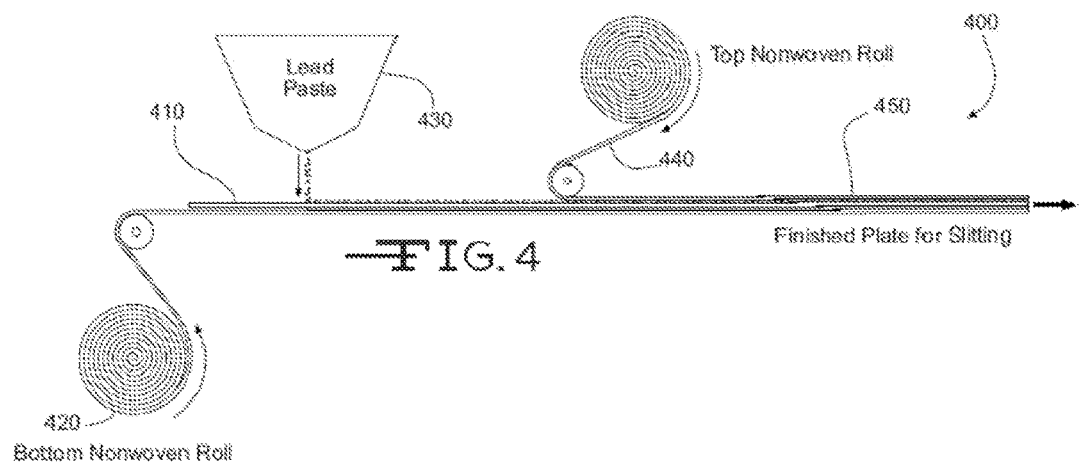
FIG. 4 illustrates a process for preparing an electrode or plate having a nonwoven fiber mat disposed on or near a surface of the electrode or plate.

Referring now to FIG. 4, illustrated is a process 400 for manufacturing an electrode. The process may involve transporting a lead alloy grid 410 on a conveyor toward an active material 430 applicator (e.g., lead or lead oxide paste applicator), which applies or pastes the active material 430 to the grid 410. A nonwoven mat roll 420 may be positioned below grid 410 so that a reinforcement mat is applied to a bottom surface of the grid 410. The reinforcement mat may include a conductive material and/or layer as described herein. In some embodiments, the reinforcement mat may also include a blend of coarse fibers as described herein. A second nonwoven mat roll 440 may be positioned above grid 410 so that a second reinforcement mat is applied to a top surface of the grid 410. The second reinforcement mat may also include a conductive material and/or layer and/or blend of coarse fibers (similar to or different from reinforcement mat 420). The resulting electrode or plate 450 may subsequently be cut to length via a plate cutter (not shown). As described herein, the active material 430 may be applied to the grid 410 and/or top and bottom of reinforcement mats, 440 and 420, so that the active material impregnates or saturates the mats to a desired degree.

Figure 5:
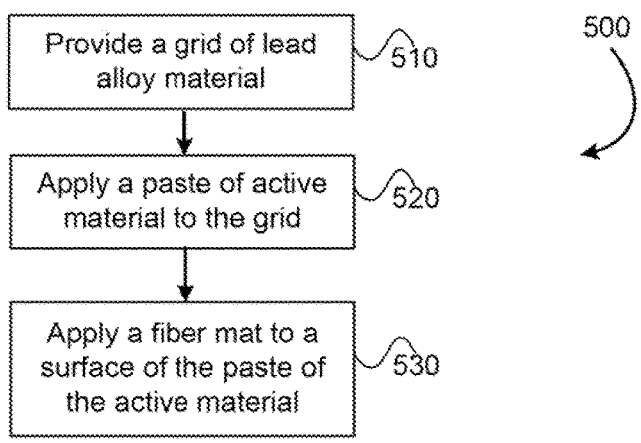
FIG. 5 illustrates a method of manufacturing a plate of a lead-acid battery.

Referring now to FIG. 5, illustrated is a method 500 of manufacturing a plate of a lead-acid battery. At block 510, a grid of lead alloy material is provided. The grid of lead alloy material may be either for a positive electrode (e.g., grid/conductor 206) or a negative electrode (e.g., grid/conductor 216) of a battery. At block 520, a paste of active material is applied to the grid of lead alloy material to form a battery plate or electrode (i.e., negative or positive electrode). At block 530, a nonwoven fiber mat is applied to a surface of the paste of the active material such that the nonwoven fiber mat is disposed at least partially within the paste of active material. As described herein, the nonwoven fiber mat may include a plurality of fibers, a binder material that couples the plurality of fibers together, and a conductive material disposed at least partially within the nonwoven fiber mat so as to contact the paste of active material. The conductive material may be any material described herein and/or a conductive layer that is formed on the nonwoven fiber mat. The nonwoven fiber mat may have an electrical resistant of less than about 100,000 ohms per square to enable electron flow on a surface of the nonwoven fiber mat. In some embodiments, the nonwoven fiber mat may be disposed within the paste of active material between about 0.001 inches and about 0.020 inches.

In some embodiments, the method may also include applying a second nonwoven fiber mat to an opposite surface of the paste of active material so that the grid of lead alloy material is disposed between two nonwoven fiber mats. The second nonwoven fiber mat may also contain a conductive material that is disposed at least partially within the second nonwoven fiber mat so as to contact the paste of active material. In some embodiments, the nonwoven fiber mat may have a thickness of 0.009 inches or less and/or a tensile strength of at least 30 lbs/3 inch.

In some embodiments, the plurality of fibers may include a blend of coarse fibers as previously described. For example, the plurality of fibers may include first fibers having fiber diameters between about 6 µm and about 11 µm and second fibers having fiber diameters between about 10 µm and about 20 µm. In some embodiments, the binder may include the conductive material. The binder may be applied to the mat between about 10% and 45% by weight, between about 20% and 30% by weight, and the like. In some embodiments, the conductive material may include a plurality of conductive fibers that are entangled with fibers of the nonwoven fiber mat.

Examples

Two reinforcement mats were prepared according to the embodiments described herein. The resistance of the mats was then measured. The methods of manufacturing the mats and the results are provided below.

1. Reinforcement Mat Using Graphene as a Conductive Coating

To produce the grapheme conductive coating, a suspension mixture was prepared using graphene (xGnP-M-15 from XG Sciences) and an acrylic binder (RHOPLEX™ HA-16 from Dow Chemical). The suspension mixture was prepared such that it contained approximately 0.5% binder and 1.5% graphene. A spray gun was then used to apply the mixture to a glass mat (Dura-Glass® mat PR-9 and B-10). The mat was then dried at 125 C for approximately 1 hr and cured at 175 C for approximately 3 mins. The surface resistance was then measured and the results are provided in Table 1 below

TABLE 1

Reinforcement Mat Using Graphene as a Conductive Coating

| Sample | Surface resistance (K-Ohm) | Sample length (cm) | Sample width (cm) | Surface resistivity (K-Ohm/sq.) | Weight before coating (g) | Graphene % |
|---|---|---|---|---|---|---|
| B-10 (1) | 1.84 | 14.3 | 12.2 | 1.6 | 0.7609 | 15.8% |
| B-10 (2) | 3.41 | 14.2 | 12.2 | 2.9 | 0.7643 | 14.5% |
| B-10 (3) | 2.25 | 14.2 | 11.9 | 1.9 | 0.7334 | 17.3% |
| PR-9 (1) | 13.76 | 14.2 | 12 | 11.6 | 0.4577 | 10.1% |
| PR-9 (2) | 18.26 | 14.2 | 12.3 | 15.8 | 0.4651 | 11.7% |
| PR-9 (3) | 5.29 | 14.7 | 12.2 | 4.4 | 0.4728 | 8.9% |

By using the graphene material, a significant weight loss of the coating after a standard acid test (40 wt. % sulfuric acid, 70 C for 72 hrs) was not exhibited or experienced. As such, the graphene coated glass mats experience similar weight loss as uncoated glass mats. However, a slight drop in conductivity was observed after the mat was exposed to sulfuric acid for an extended time. This slight drop in conductivity may indicate reaction between the graphene and sulfuric acid.

2. Reinforcement Mat Using CNS (Carbon Nanostructure) as a Conductive Coating

To produce the CNS conductive coating, a suspension mixture was prepared using CNS (from Applied Nanostructured Solutions LLC) and/or an acrylic binder (RHOP-LEX™ HA-16 from Dow Chemical). The suspension mixture was prepared such that it contained approximately 1% binder (or no binder) and 0.5% CNS. A glass mat (Dura-Glass® mat PR-9 or uncoated polyester spunbond mat) was placed in the mixture and water was vacuumed out. A uniform coating of the CNS was obtained. The mat was then dried at 125 C for approximately 1 hr and cured at 175 C for approximately 3 mins. The surface resistance was then measured and the results are provided in Table 2 below.

TABLE 2

Reinforcement Mat Using CNS (Carbon Nanostructure) as a Conductive Coating

| Sample | Surface resistance (Ohm) | Sample length (inch) | Sample width (inch) | Surface resistivity (Ohm/sq.) | CNS % | Comment |
|---|---|---|---|---|---|---|
| PR-9 (1) | 180 | 14 | 12 | 154.3 | 2.50% | With binder |
| PR-9 (2) | 65 | 14 | 14 | 65.0 | 15% | Without binder |
| PR-9 (3) | 53 | 14 | 14 | 53.0 | 25% | With binder |
| PR-9 (4) | 50 | 14 | 14 | 50.0 | 15% | Without binder |
| PR-9 (5) | 66 | 14 | 14 | 66.0 | 25% | Without binder |
| Polyester (1) | 239 | 13.5 | 13.5 | 239.0 | 0.3% | With binder |
| Polyester (2) | 68 | 13.5 | 13.5 | 68.0 | 2% | With binder |
| Polyester (2) | 132 | 13.5 | 13.5 | 132.0 | 0.66% | With binder |

By using the CNS material, a significant weight loss of the coating after a standard acid test (40 wt. % sulfuric acid, 70 C for 72 hrs) was not exhibited or experienced. As such, the CNS coated glass mats experience similar weight loss as uncoated glass mats. In addition, a significant drop in conductivity was not observed after the mat was exposed to sulfuric acid for an extended time. It is believed that since the CNS has the structure of a "crosslinked matrix of carbon nanotubes," even though sulfuric acid attacks some carbon, the whole structure remains connected and, thus, the conductivity of the coating is not affected. Given this results, CNS may be a better choice as a conductive coating than graphene. Further, the CNS coating provides a much better conductivity (i.e., less resistance) than graphene on nonwoven mats. For example, as shown in Table 1, K-ohm units are used for graphene resistance, whereas in Table 2, Ohm units are used for CNS resistance.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A lead-acid battery comprising:
   a positive electrode;
   a negative electrode;
   a separator positioned between the positive electrode and the negative electrode so as to electrically insulate the positive and negative electrodes, the separator including:
   a microporous polymer film; and
   a nonwoven fiber mat positioned adjacent the microporous polymer film so as to reinforce the microporous polymer film; and
   an additional fiber mat positioned adjacent either the positive electrode or the negative electrode to reinforce the positive or negative electrode, the additional fiber mat being impregnated or saturated with the active material of the positive or negative electrode, wherein the additional fiber mat comprises:
   a plurality of entangled fibers;
   a binder material that couples the plurality of entangled fibers together; and
   a conductive material disposed throughout the additional fiber mat so as to contact the positive or the negative electrode, wherein the additional fiber mat has an electrical resistance of less than about 100,000 ohms per square so as to enable electron flow on the surface of the additional fiber mat, and wherein the additional fiber mat has a total tensile strength of at least 30 lbs/3 inch.

2. The lead-acid battery of claim 1, wherein the additional fiber mat has an electrical resistance of less than about 50,000 ohms per square.

3. The lead-acid battery of claim 1, wherein the separator also includes a conductive material disposed on at least one surface of the nonwoven fiber mat or throughout the nonwoven fiber mat such that the nonwoven fiber mat comprises an electrical resistance of less than about 100,000 ohms per square to enable electron flow on the surface of the nonwoven fiber mat.

4. The lead-acid battery of claim 1, wherein the conductive material comprises a plurality of conductive fibers that are entangled with fibers of the additional fiber mat.

5. The lead-acid battery of claim 4, wherein the binder material includes the plurality of conductive fibers prior to application of the binder with the additional fiber mat.

6. The lead-acid battery of claim 1, wherein the plurality of fibers of the additional fiber mat comprise glass fibers.

7. The lead-acid battery of claim 1, wherein the additional fiber mat comprises a first fiber mat that is positioned on a first side of the positive electrode or the negative electrode so that the first fiber mat directly contacts the positive electrode or the negative electrode, and wherein the lead-acid battery further comprises a second fiber mat that is positioned on a second side of the positive electrode or the negative electrode opposite the first side so that the second fiber mat directly contacts the positive electrode or the negative electrode, wherein the second fiber mat comprises a conductive material disposed on at least one surface of the second fiber mat or throughout the second fiber mat such that the second fiber mat has an electrical resistance of less than about 100,000 ohms per square to enable electron flow on the surface of the second fiber mat.

8. A plate or electrode for a lead-acid battery comprising:
a grid of lead alloy material;
a paste of active material applied to the grid of lead alloy material; and
a nonwoven fiber mat disposed at least partially within the paste of active material, the nonwoven fiber mat including:
a plurality of entangled fibers;
a binder material that couples the plurality of entangled fibers together; and
a conductive material disposed within the nonwoven fiber mat so as to contact the paste of active material, the nonwoven fiber mat having an electrical resistance of less than about 100,000 ohms per square to enable electron flow on a surface of the nonwoven fiber mat and the nonwoven fiber mat having a total tensile strength of at least 30 lbs/3 inch.

9. The plate or electrode of claim 8, wherein the nonwoven fiber mat is disposed within the paste of active material between about 0.001 inches and about 0.020 inches.

10. The plate or electrode of claim 8, wherein the nonwoven fiber mat is a first nonwoven fiber mat, and wherein the plate or electrode further comprises a second nonwoven fiber mat disposed at least partially within the paste of active material on a side opposite the first nonwoven fiber mat such that the plate or electrode is disposed between two nonwoven fiber mats.

11. The plate or electrode of claim 10, wherein the two nonwoven fiber mats comprise opposite sides of a bag that encloses or envelopes the paste of the active material and the plate or electrode.

12. The plate or electrode of claim 8, wherein the binder is applied to the nonwoven fiber mat between about 10% and 45% by weight.

13. The plate or electrode of claim 12, wherein the binder includes the conductive material.

14. The plate or electrode of claim 8, wherein the nonwoven fiber mat comprises fibers selected from the group consisting of: glass fibers, polyolefin fibers, and polyester fibers.

15. The plate or electrode of claim 8, wherein the conductive material comprises a plurality of conductive fibers that are entangled with fibers of the nonwoven fiber mat.

16. The plate or electrode of claim 1, wherein the additional fiber mat has a thickness of between about 50 micrometers and 500 micrometers.

* * * * *